United States Patent
Zhao et al.

(10) Patent No.: US 12,128,876 B2
(45) Date of Patent: Oct. 29, 2024

(54) METHOD AND SYSTEM FOR CONTROLLING FOUR-WHEEL-INDEPENDENT-DRIVE ELECTRIC VEHICLE (4WID) EV

(71) Applicant: CHANGZHOU INSTITUTE OF TECHNOLOGY, Changzhou (CN)

(72) Inventors: Jingbo Zhao, Changzhou (CN); Jie Chen, Changzhou (CN)

(73) Assignee: Changzhou Institute of Technology, Changzhou (CN)

( * ) Notice: Subject to any disclaimer, the term of this patent is extended or adjusted under 35 U.S.C. 154(b) by 53 days.

(21) Appl. No.: 17/642,400

(22) PCT Filed: Dec. 9, 2020

(86) PCT No.: PCT/CN2020/134787
§ 371 (c)(1),
(2) Date: Mar. 11, 2022

(87) PCT Pub. No.: WO2021/189948
PCT Pub. Date: Sep. 30, 2021

(65) Prior Publication Data
US 2023/0018500 A1    Jan. 19, 2023

(30) Foreign Application Priority Data
Mar. 24, 2020   (CN) .......................... 202010213510.2

(51) Int. Cl.
*B60W 30/02*   (2012.01)
*B60W 10/08*   (2006.01)
(Continued)

(52) U.S. Cl.
CPC ............ *B60W 30/02* (2013.01); *B60W 10/08* (2013.01); *B60W 10/119* (2013.01);
(Continued)

(58) Field of Classification Search
CPC .... B60W 30/02; B60W 10/08; B60W 10/119; B60W 10/20; B60W 30/182;
(Continued)

(56) References Cited

U.S. PATENT DOCUMENTS 9,463,697 B1   10/2016   Gauthier
2004/0055304 A1*   3/2004   Shimizu .................. H02P 9/305
701/33.7
(Continued)

FOREIGN PATENT DOCUMENTS

CN   101767535   6/2010
CN   103318051   9/2013
(Continued)

*Primary Examiner* — Ig T An
*Assistant Examiner* — Christine Nguyen Huynh
(74) *Attorney, Agent, or Firm* — DeLio Peterson & Curcio LLC; David R. Pegnataro

(57) ABSTRACT

The present disclosure provides a method and system for controlling a four-wheel-independent-drive (4WID) electric vehicle (EV) which incorporates the method steps of: acquiring driving environmental information of the vehicle, running state information of the vehicle and driving expectation information of a driver; tracking a body attitude; switching a condition of the vehicle according to information of an upper module; calculating an expected longitudinal torque, an expected lateral torque and an expected yaw torque of the vehicle that meet a driver's expectation; optimally distributing the torques of the vehicle; and generating armature voltage signals required by output torques of motors and controlling the motors. The method divides the driving process of the vehicle into multiple independent driving conditions. The method does not globally implement operation and control in multiple driving conditions with a single control strategy, but coordinately switches the conditions according to multiple control modes and multiple control strategies.

6 Claims, 2 Drawing Sheets

(51) Int. Cl.
*B60W 10/119* (2012.01)
*B60W 10/20* (2006.01)
*B60W 30/182* (2020.01)
*B60W 30/188* (2012.01)
*B60W 50/02* (2012.01)

(52) U.S. Cl.
CPC .......... *B60W 10/20* (2013.01); *B60W 30/182* (2013.01); *B60W 30/188* (2013.01); *B60W 50/0205* (2013.01); *B60W 50/0225* (2013.01); *B60W 2520/26* (2013.01); *B60W 2555/00* (2020.02)

(58) Field of Classification Search
CPC .......... B60W 30/188; B60W 50/0205; B60W 50/0225; B60W 2520/26; B60W 2555/00; B60W 2710/083; B60W 2050/0292; B60W 2540/18; B60W 50/029; B60W 2050/021; B60W 2050/022; B60W 2540/10; B60W 2720/40; Y02T 10/72; B60K 7/0007; B60L 15/20; B60L 2240/423

See application file for complete search history.

(56) References Cited

U.S. PATENT DOCUMENTS

2016/0318401 A1* 11/2016 Mogi ...................... B60L 3/102
2020/0290625 A1* 9/2020 Berntorp ......... B60W 30/18172

FOREIGN PATENT DOCUMENTS

| CN | 110641475 A | * | 1/2020 |
|----|-------------|---|--------|
| CN | 110641475   |   | 3/2020 |
| CN | 111332302   |   | 6/2020 |
| DE | 102012209626 |  | 12/2013 |
| JP | 2016201953  |   | 12/2016 |

* cited by examiner

METHOD AND SYSTEM FOR CONTROLLING FOUR-WHEEL-INDEPENDENT-DRIVE ELECTRIC VEHICLE (4WID) EV

CROSS REFERENCE TO RELATED APPLICATION

This patent application claims the benefit and priority of Chinese Patent Application No. 202010213510.2, filed on Mar. 24, 2020, the disclosure of which is incorporated by reference herein in its entirety as part of the present application.

TECHNICAL FIELD

The present disclosure relates to the field of electric vehicle (EV) control, and in particular, to a method and system for controlling a four-wheel-independent-drive (4WID) EV.

BACKGROUND ART

With the increasing environmental and energy problems, new energy vehicles have gained unprecedented development opportunity, and the 4WID EVs have entered the field of vision of researchers. A 4WID EV includes two steering motors and four driving motors, with the simple structure, easy control, the number of actuators obviously greater than the degree of freedom (DOF) and huge control potential. Existing control methods of the 4WID EV are single, specifically, when faults occur in the actuator, these methods cannot effectively control the body attitude to meet the driving expectation of the driver, and thus the operability and safety of the vehicle are greatly reduced.

SUMMARY

The present disclosure provides a method for controlling a 4WID EV and an implementation thereof, to solve the problem that existing single control strategies of the 4WID EV neither meet the driving expectation of the driver in all conditions nor effectively improve the safety of the vehicle. The method is implemented by employing a distributed drive system for the vehicle, dividing a failure of the actuator into multiple independent conditions, coordinately switching the conditions according to multiple control modes and multiple control strategies, and coordinately and optimally distributing driving torques during vehicle driving when the failure occurs in the actuator and the driving expectation of the drive is met, thus improving the safety and stability of the vehicle.

The present disclosure adopts the following technical solutions.

A method for controlling a 4WID EV includes the following steps:

acquiring driving environmental information of the vehicle, running state information of the vehicle and driving expectation information of a driver;

tracking a body attitude, where a sliding mode variable structure control algorithm is adopted, and the body attitude is tracked according to driver's operation information acquired by the vehicle to directly obtain a longitudinal torque, a lateral torque, and a yaw torque of the vehicle;

switching a condition of the vehicle according to information of an upper module, where a switching control is established based on a hybrid theory, and a failure is switched according to a discrete state characteristic of the vehicle;

calculating an expected longitudinal torque, an expected lateral torque, and an expected yaw torque of the vehicle that meet a driver's expectation;

optimally distributing the torques of the vehicle, where a reconfigurable control distribution theory is adopted, objective functions for all failures of an actuator are consistent, a restraint is determined according to a determined failure to obtain a driving torque of an unfailed actuator, and the vehicle has an emergency stop in case of an uncompensable condition; and generating armature voltage signals required by output torques of motors and controlling the motors.

Further, the condition may include an unfailed condition, a single-driving-motor failure, a dual-driving-motor failure, a multi-driving-motor failure, a single-steering-motor failure, and a dual-steering-motor failure, the dual-driving-motor failure may include a homolateral dual-driving-motor failure and a heterolateral dual-driving-motor failure, and the heterolateral dual-driving-motor failure may include a coaxial dual-driving-motor failure and a heteroaxial dual-driving-motor failure.

Further, the failure may include a partial failure and a complete failure; a condition when an expected output torque of a motor is less than an outputtable torque of the motor and the outputtable torque of the motor is less than a maximum output torque of the motor may be defined as the partial failure of the actuator; and a condition when the expected output torque of the motor is greater than the outputtable torque of the motor and the outputtable torque of the motor is less than the maximum output torque of the motor may be defined as the complete failure of the actuator.

Further, the optimally distributing the torques of the vehicle may include:

adopting a tire force control algorithm based on a tire adhesion margin in the unfailed condition; and adopting a tire force distribution algorithm with a reconfigurable constraint in the single-driving-motor failure and the dual-driving-motor failure.

A system for controlling a 4WID EV includes:

a fault detection module, configured to acquire driving environmental information of the vehicle, running state information of the vehicle, and failure information of an actuator;

a body attitude tracking module, configured to track an expected driving attitude of the vehicle, where a sliding mode variable structure control algorithm is adopted, and a body attitude is tracked according to driver's operation information acquired by the vehicle to directly obtain a longitudinal torque, a lateral torque, and a yaw torque of the vehicle;

a condition switching control module, configured to switch a driving condition and the control algorithm of the vehicle, where a switching control is established based on a hybrid theory, and a failure is switched according to a discrete state characteristic of the vehicle;

a driving torque coordinated distribution module, configured to calculate expected torques of the vehicle in a failure of the actuator, and optimally distribute the torques, where a reconfigurable control distribution theory is adopted, objective functions for all failures of an actuator are consistent, and a restraint is determined according to a failure determined by the condition switching control module to obtain a driving torque of an unfailed actuator; and a motor control module, configured to control driving motors and steering motors, and output driving torques of the vehicle.

Further, the condition switching control module may switch the driving condition of the vehicle based on a switching control theory, and may include:

an event identifier, configured to monitor and analyze vehicle information;

a condition switcher, configured to switch the driving condition of the vehicle according to the vehicle information, and select a control strategy meeting a control objective; and a switching monitor, configured to ensure a stability of switching the driving condition of the vehicle.

The present disclosure has the following beneficial effects.

The method and system for controlling a 4WID EV provided by the present disclosure solve the problem that the single control strategies of the vehicle in the failure of the actuator neither meet the driving expectation of the driver nor obviously improve the safety of the vehicle. The system for controlling a distributed drive EV provided by the present disclosure divides the driving process of the vehicle into multiple independent driving conditions. The system does not globally implement operation and control in multiple driving conditions with a single control strategy, but coordinately switches the conditions according to multiple control modes and multiple control strategies, and coordinately and optimally distributing driving torques during vehicle driving without affecting the driving expectation of the driver, thus improving the stability, operability and safety of the vehicle in driving.

DETAILED DESCRIPTION OF THE EMBODIMENTS

The implementations of the present disclosure will be described below in detail with reference to the accompanying drawings.

Figure 1:
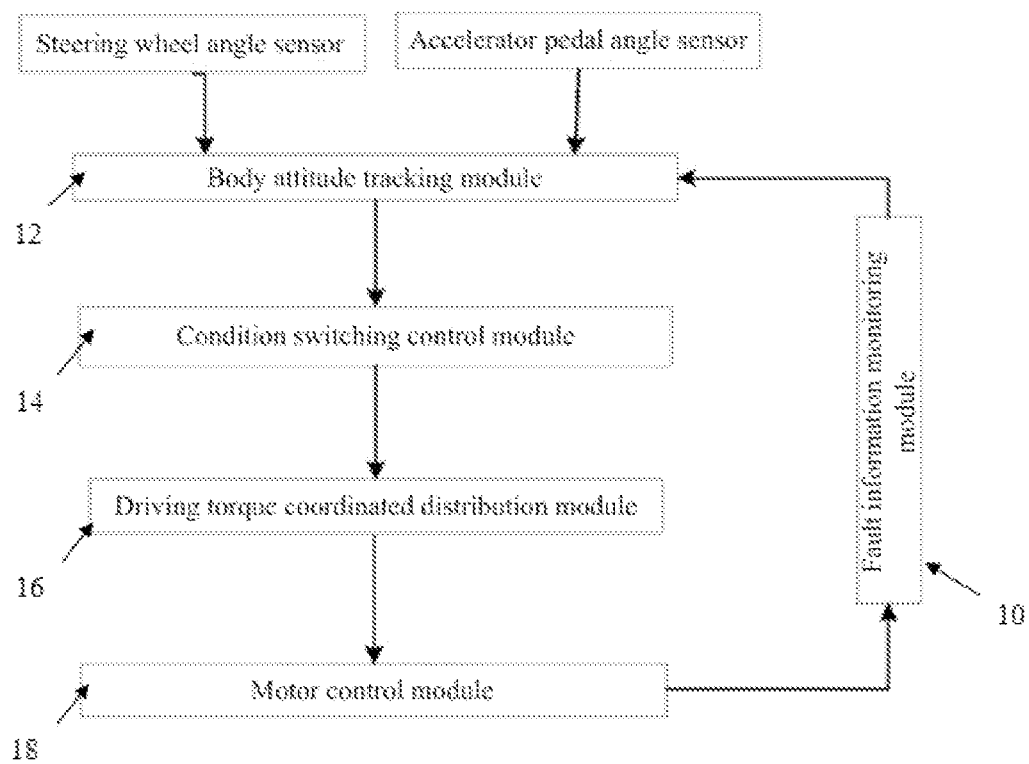
FIG. 1 is a block diagram of a system for controlling a 4WID EV.

The present disclosure provides a system for controlling a 4WID EV. Referring to FIG. 1, the system for controlling a 4WID EV specifically includes the following modules:

a fault detection module 10, configured to acquire driving environmental information of the vehicle, running state information of the vehicle and failure information of an actuator;

a body attitude tracking module 12, configured to track an expected driving state of a driver;

a condition switching control module 14, configured to switch a driving condition and a control algorithm of the vehicle;

a driving torque coordinated distribution module 16, configured to calculate expected torques of the vehicle in a failure of the actuator, and optimally distribute the torques; and a motor control module 18, configured to control driving motors and steering motors, and output driving torques and tire angles of the vehicle.

Figure 3:
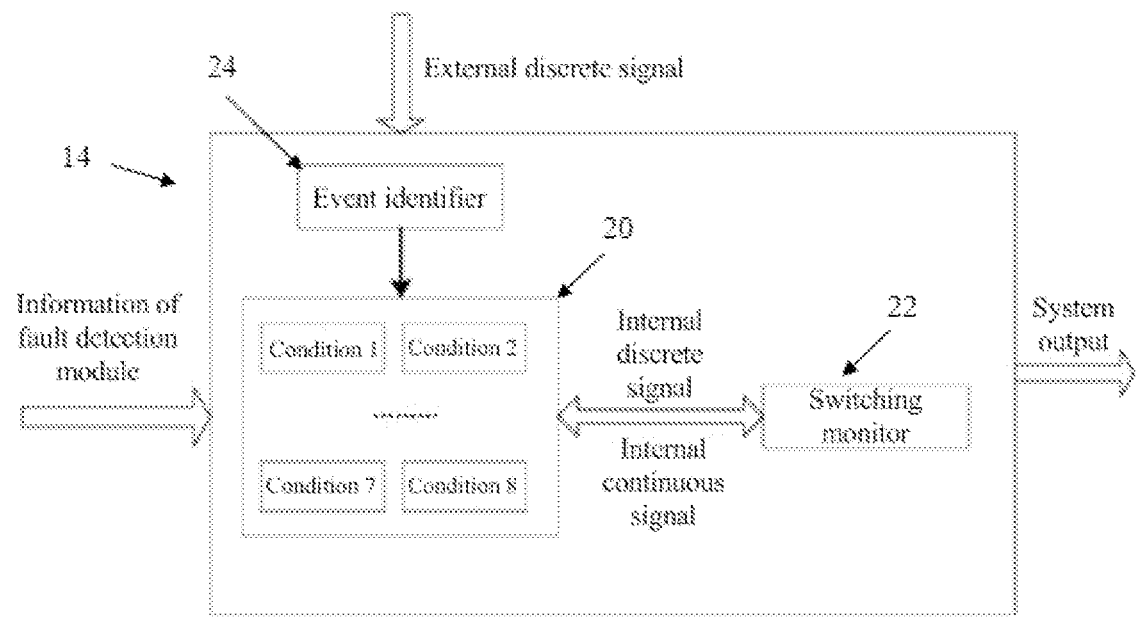
FIG. 3 is a diagram for dividing a failure of an actuator.

As a preferable technical solution to the embodiment, the condition switching control module 14 is as illustrated in FIG. 3. Specifically, the condition switching control module based on a switching control theory includes a condition switcher 20, a switching monitor 22 and an event identifier 24. The event identifier is configured to monitor and analyze vehicle information; the condition switcher is configured to switch the driving condition of the vehicle according to the vehicle information, and select a control strategy meeting a control objective; and the switching monitor is configured to ensure a stability of switching the driving condition of the vehicle.

Figure 2:
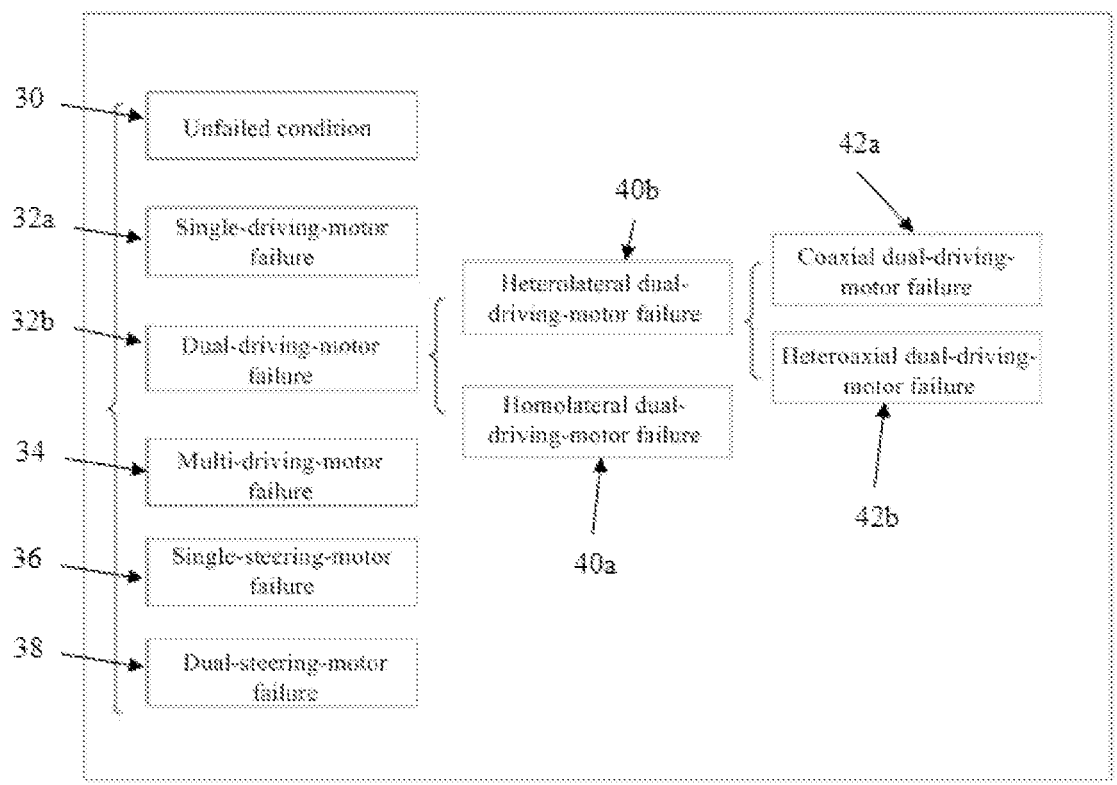
FIG. 2 is a diagram of a condition switching control module.

Further, FIG. 2 illustrates the division for the condition of the vehicle. Specifically, the condition includes a first condition: an unfailed condition 30, a second condition: a single-driving-motor failure 32a and a dual-driving-motor failure 32b, a sixth condition: a multi-driving-motor failure 34, a seventh condition: a single-steering-motor failure 36 and an eighth condition: a dual-steering-motor failure 38; the dual-driving-motor failure 32b includes a third condition: a homolateral dual-driving-motor failure 40a and a heterolateral dual-driving-motor failure 40b; and the heterolateral dual-driving-motor failure 40b includes a fourth condition: a coaxial dual-driving-motor failure 42a and a fifth condition: a heteroaxial dual-driving-motor failure 42b.

Another aspect of the present disclosure provides an implementation of the system for controlling a 4WID EV, including a longitudinal speed sensor, a lateral speed sensor, an accelerator pedal sensor, a longitudinal acceleration sensor, a motor current monitor, a motor torque sensor, a steering wheel angle sensor, a tire angle sensor, vehicle-mounted lidars, four driving motors and two steering motors. The longitudinal speed sensor is configured to obtain a longitudinal speed of the vehicle; the lateral speed sensor is configured to acquire a lateral speed of the vehicle; the accelerator pedal sensor is provided on an accelerator pedal of the vehicle, and configured to determine a driving expectation of the driver according to an accelerator pedal opening; the vehicle-mounted lidars are arranged on a front, rear and middle positions of the vehicle, and configured to acquire longitudinal speed information of the vehicle and distances with surrounding vehicles; the longitudinal acceleration sensor and the tire angle sensor are provided in a center of a tire, and configured to acquire an actual acceleration and an actual tire angle of the vehicle; the motor current monitor and the motor torque sensor are provided at each of the driving motors and the steering motors, and configured to acquire real-time current information and real-time torque information in each of the motors; the steering wheel angle sensor is provided at a bottom of a steering wheel, and configured to acquire an angle of the steering wheel; the driving motors are configured to drive the vehicle; and the steering motors are configured to steer the vehicle.

Another aspect of the present disclosure provides a method for controlling a 4WID EV, including the following steps:

The fault detection module acquires driving environmental information of the vehicle, running state information of the vehicle and failure information of an actuator, and sends acquired information to the condition switching control module.

The body attitude tracking module acquires information of an upper module, and tracks an expected driving state of a driver based on an advanced control algorithm.

In the condition switching control module, the switching monitor analyzes and processes information from the fault detection module and the motor control module through a condition mode identifier; and under the driving of a discrete event, the mode switcher switches preset control work in the condition controller according to a mode switching rule as well as internal and external discrete input signals of the system, to implement hybrid switching for the working mode of the condition switching control module. Control signals for driving motors and steering motors are generated through the control algorithm in the controller, armature voltage signals are output by the drive module, and the output armature voltage signals are processed by the output monitor to obtain the final armature voltage values.

According to the armature voltage signals from the condition switching control module, the motor control module controls the driving motors to output the driving torques of the vehicle in real time, thus coordinately distributing the driving torques of the distributed drive EV according to the driving state of the driver.

As a preferable technical solution of the embodiment, the mode switching rule is as follows:

According to the driver's expected output torques monitored by the fault detection module, the actual output torques of the motors, the driver's expected wheel angles, the actual wheel angles, and information on the single-driving-motor failure in the processor, the system determines that the vehicle is in the single-driving-motor failure; and the system enters the working mode in the single-driving-motor failure to coordinately compensate the driving torques for the driving motors of the vehicle, such that the vehicle drives according to the driver's expectation.

According to the driver's expected output torques monitored by the fault detection module, the actual output torques of the motors, the driver's expected wheel angles, the actual wheel angles, and information on the dual-driving-motor failure in the processor, the system determines that the vehicle is in the dual-driving-motor failure; and the system enters the working mode in the dual-driving-motor failure to coordinately compensate the driving torques for the driving motors of the vehicle, such that the vehicle drives according to the driver's expectation.

According to the driver's expected output torques monitored by the fault detection module, the actual output torques of the motors, the driver's expected wheel angles, the actual wheel angles, and information on the multi-driving-motor failure in the processor, the system determines that the vehicle is in the multi-driving-motor failure; and the system enters the working mode in the multi-driving-motor failure and emergently brakes the vehicle.

According to the driver's expected output torques monitored by the fault detection module, the actual output torques of the motors, the driver's expected wheel angles, the actual wheel angles, and information on the single-steering-motor failure in the processor, the system determines that the vehicle is in the single-steering-motor failure; and the system enters the working mode in the single-steering-motor failure to coordinately compensate the driving torques for the driving motors of the vehicle and the wheel angle, such that the vehicle drives according to the driver's expectation.

According to the driver's expected output torques monitored by the fault detection module, the actual output torques of the motors, the driver's expected wheel angles, the actual wheel angles, and information on the dual-steering-motor failure in the processor, the system determines that the vehicle is in the dual-steering-motor failure; and the system enters the working mode in the dual-steering-motor failure to coordinately compensate the driving torques for the driving motors of the vehicle and the wheel angle, such that the vehicle drives according to the driver's expectation.

Further, the failure of the actuator includes a partial failure and a complete failure. A condition when an expected output torque of a motor is less than an outputtable torque of the motor and the outputtable torque of the motor is less than a maximum output torque of the motor is defined as the partial failure of the actuator; and a condition when the expected output torque of the motor is greater than the outputtable torque of the motor and the outputtable torque of the motor is less than the maximum output torque of the motor is defined as the complete failure of the actuator.

Further, the control algorithm for the failure of the actuator is set forth hereinafter:

In the unfailed condition of the actuator, the tire force control algorithm based on the tire adhesion margin is adopted, and specifically, the objective function is given by:

$$\min \varepsilon = \sum_{i=1}^{4} C_i * \frac{\sqrt{F_{xi}^2 + F_{yi}^2}}{\mu_i F_{zi}}$$

There are the following constraints:

$$\sum_{i=1}^{4} F_{xi} = F_t$$

$$\frac{l}{2}(F_{x1} + F_{x2} - F_{x3} - F_{x4}) = M_z$$

$$|F_{xi}| \leq \frac{T_{max}}{r}$$

$$F_{xi}^2 + F_{yi}^2 \leq (\mu_i F_{zi})^2$$

where, $\mu_i$ is the tire adhesion coefficient, $F_{xi}$ is the longitudinal force, $F_{yi}$ is the lateral force, $F_{zi}$ is the vertical force, $F_t$ is the total driving force, $M_z$ is the yaw torque, $T_{max}$ is the maximum output torque of the driving motor, r is the radius of the tire, and i=1, 2, 3, 4 represent the left front, right front, left rear, and right rear driving wheels of the vehicle.

The maximum speed threshold $V_{xY}$ of the vehicle is set in the partial failure of the actuator. The tire force control algorithm based on the tire adhesion margin is adopted, and specifically, the objective function is given by:

$$\min \varepsilon = \sum_{i=1}^{4} C_i * \frac{\sqrt{F_{xi}^2 + F_{yi}^2}}{\mu_i F_{zi}}$$

There are the following constraints:

$$\sum_{i=1}^{4} F_{xi} = F_t$$

$$\frac{l}{2}(F_{x1} + F_{x2} - F_{x3} - F_{x4}) = M_z$$

$$|F_{xi}| \leq \frac{T_m}{r}$$

$$F_{xi}^2 + F_{yi}^2 \leq (\mu_i F_{zi})^2$$

where, $\mu_i$ is the tire adhesion coefficient, $F_{xi}$ is the longitudinal force, $F_{yi}$ is the lateral force, $F_{zi}$ is the vertical force, $F_t$ is the total driving force, $M_z$ is the yaw torque, $T_{max}$ is the outputtable torque of the driving motor, r is the radius of the tire, and i=1, 2, 3, 4 represent the left front, right front, left rear, and right rear driving wheels of the vehicle.

Further, all conditions considered below are the complete failures of the actuator:

In the single-driving-motor failure, with the failure of the left front motor as an example, $T_1=T_2=T_{m1}$, output torques of the coaxial motors on the vehicle are the same and the stability of the vehicle is kept, where $T_1$ and $T_2$ are left front and right front output torques of the vehicle, respectively, and $T_{m1}$ is the maximum output torque of the left front motor.

In the coaxial dual-driving-motor failure, the tire force control algorithm based on the tire adhesion margin is adopted and the following constraints are added:

$$T_1 \leq \min(T_{B1}, T_{B2})$$

$$T_2 \leq \min(T_{B1}, T_{B2})$$

$T_1$ and $T_2$ are output torques of two faulty driving motors, and $T_{B1}$ and $T_{B2}$ are maximum outputtable torques of the two faulty driving motors.

In the heteroaxial dual-driving-motor failure, with the failures of the left front driving motor and the right rear driving motor as an example, the tire force control algorithm based on the tire adhesion margin is adopted and the following constraints are added:

$$T_1 \leq T_2$$

$$T_4 \leq T_3$$

where, $T_1$, $T_2$, $T_3$ and $T_4$ are output torques of the left front, right front, left rear and right rear driving motors of the vehicle.

In the homolateral dual-driving-motor failure and the multi-driving-motor failure, the vehicle cannot keep stable by redistributing the torques of the motors and brakes emergently, for the sake of ensuring the safety of the driver and passengers.

In the steering-motor failure, the motors are cut off, and the steering system is switched to the purely mechanical steering system or electronically assisted steering system.

In conclusion, according to the method and system for controlling a 4WID EV provided by the present disclosure, the control method includes: acquiring driving environmental information and running state information of the vehicle as well as fault information of an actuator; tracking a driving expectation of a driver, keep a body attitude and calculating an expected total longitudinal torque, an expected total lateral torque and an expected total yaw torque of the vehicle; and switching a driving condition of the vehicle and outputting expected driving torques of the vehicle; and the control system includes a vehicle fault information monitoring module, a body attitude tracking module, a condition switching control module and a motor control module, where the vehicle fault information monitoring module is configured to acquire driving environmental information and running state information of the vehicle as well as fault information of an actuator; the body attitude tracking module is configured to track a driving expectation of a driver, keep a body attitude and calculate an expected total longitudinal torque, an expected total lateral torque and an expected total yaw torque of the vehicle; the condition switching control module is configured to switch a driving condition of the vehicle and output expected driving torques of the vehicle; and the motor control module is configured to implement straight driving and steering of the vehicle and make the vehicle more controllable. Therefore, the present disclosure can effectively control longitudinal and lateral forces of the four wheels, and provides a larger space to optimally distribute and control the longitudinal and lateral forces of the wheels.

The above descriptions are merely preferable embodiments of the present disclosure, rather than limit the present disclosure. Any modification, equivalent substitution, improvement and the like made within the spirit and principle of the present disclosure shall fall within the protection scope of the present disclosure.

What is claimed is:

1. A method for controlling a four-wheel-independent-drive (4WID) electric vehicle (EV), comprising the following steps:

acquiring driving environmental information of the vehicle, running state information of the vehicle and driving expectation information of a driver;

tracking a body attitude, utilizing a sliding mode variable structure control algorithm, and the body attitude is tracked according to driver's operation information acquired by the vehicle to directly obtain a longitudinal torque, a lateral torque, and a yaw torque of the vehicle;

switching a condition of the vehicle according to information of an upper module, wherein a switching control is established based on a hybrid theory, and a failure is switched according to a discrete state characteristic of the vehicle;

calculating an expected longitudinal torque, an expected lateral torque, and an expected yaw torque of the vehicle that meet a driver's expectation;

optimally distributing the torques of the vehicle, wherein a reconfigurable control distribution theory is adopted, objective functions for all failures of an actuator are consistent, a restraint is determined according to a determined failure to obtain a driving torque of an unfailed actuator, and the vehicle has an emergency stop in case of an uncompensable condition; and generating armature voltage signals required by output torques of motors and controlling the motors; wherein the objective functions are as follows:

$$\min \varepsilon = \sum_{i=1}^{4} C_i * \frac{\sqrt{F_{xi}^2 + F_{yi}^2}}{\mu_i F_{zi}},$$

where $\min \varepsilon$ is a minimum value of a difference between an expected output torque of a motor and a currently output torque of the motor, $C_i$ is a tire adhesion margin of i-th driving wheel, $\mu_i$ is a tire adhesion coefficient, $F_{xi}$ is a longitudinal force, $F_{yi}$ is a lateral force, $F_{zi}$ is a vertical force, and i=1, 2, 3, 4 represents a left front driving wheel, a right front driving wheel, a left rear driving wheel, and a right rear driving wheel of the vehicle;

wherein in a case that the determined failure is an unfailed condition of the actuator, the restraint is as follows:

$$\sum_{i=1}^{4} F_{xi} = F_t$$

$$\frac{1}{2}(F_{x1} + F_{x2} - F_{x3} - F_{x4}) = M_z$$

-continued $$|F_{xi}| \le \frac{T_{max}}{r}$$

$$F_{xi}^2 + F_{yi}^2 \le (\mu_i F_{zi})^2$$

wherein, $F_t$ is a total driving force, $M_z$ is a yaw torque, $T_{max}$ is a maximum output torque of a motor corresponding to the i-th driving wheel, r is a radius of the i-th driving wheel;

wherein in a case that the determined failure is a partial failure of the actuator, the restraint is as follows:

$$\sum_{i=1}^{4} F_{xi} = F_t$$

$$\frac{1}{2}(F_{x1} + F_{x2} - F_{x3} - F_{x4}) = M_z$$

$$|F_{xi}| \le \frac{T_m}{r}$$

$$F_{xi}^2 + F_{yi}^2 \le (\mu_i F_{zi})^2$$

wherein, $T_m$ is a currently output torque of a driving motor;

wherein in a case that the determined failure is a single-driving-motor failure, the restraint is determined to be that an output torque of a failed motor is equal to an output torque of a coaxial motor and both of which are equal to a maximum output torque of the failed motor;

wherein in a case that the determined failure is a coaxial dual-driving-motor failure, the restraint is as follows:

$$T_{A1} \le \min(T_{B1}, T_{B2})$$

$$T_{A2} \le \min(T_{B1}, T_{B2})$$

wherein $T_{A1}$ and $T_{A2}$ are output torques of two faulty driving motors, and $T_{B1}$ and $T_{B2}$ are maximum output torques of the two faulty driving motors $T_{A1}$ and $T_{A2}$, respectively;

wherein in a case that the determined failure is a heteroaxial dual-driving-motor failure, the restraint is as follows:

for a case that a left front driving motor and a right rear driving motor occur failure, $$T_1 \le T_2$$

$$T_4 \le T_3;$$

for a case that a right front driving motor and a left rear driving motor occur failure, $$T_2 \le T_1$$

$$T_3 \le T_4;$$

wherein, $T_1$ is an output torque of a left front driving motor, $T_2$ is an output torque of a right front driving motor, $T_3$ is an output torque of a left rear driving motor, and $T_4$ is an output torque of a right rear driving motor; and wherein in a case that the determined failure is a homolateral dual-driving-motor failure and a multi-driving-motor failure, the four-wheel-independent-drive (4WID) electric vehicle (EV) brakes emergently.

2. The method according to claim 1, wherein the condition of the vehicle comprises the unfailed condition of the actuator, the single-driving-motor failure, a dual-driving-motor failure, the multi-driving-motor failure, a single-steering-motor failure, and a dual-steering-motor failure, the dual-driving-motor failure comprises the homolateral dual-driving-motor failure and a heterolateral dual-driving-motor failure, and the heterolateral dual-driving-motor failure comprises the coaxial dual-driving-motor failure and heteroaxial dual-driving-motor failure.

3. The method according to claim 2, wherein a failure comprises the partial failure and a complete failure; wherein a condition when the expected output torque of the motor is less than a currently output torque of the motor and the currently output torque of the motor is less than a maximum output torque of the motor is defined as the partial failure of the actuator; and wherein a condition when the expected output torque of the motor is greater than the currently output torque of the motor and the currently output torque of the motor is less than the maximum output torque of the motor is defined as the complete failure of the actuator.

4. The method according to claim 2, wherein the step of optimally distributing the torques of the vehicle comprises:
adopting a tire force control algorithm based on a tire adhesion margin in the unfailed condition of the actuator; and
adopting a tire force distribution algorithm with a reconfigurable constraint in the single-driving-motor failure and the dual-driving-motor failure.

5. A system for controlling a four-wheel-independent-drive (4WID) electric vehicle (EV), comprising:
a fault detection module acquiring driving environmental information of the vehicle, running state information of the vehicle, and failure information of an actuator;
a body attitude tracking module tracking an expected driving attitude of the vehicle, utilizing a sliding mode variable structure control algorithm, and tracking a body attitude according to a driver's operation information acquired by the vehicle to obtain directly a longitudinal torque, a lateral torque, and a yaw torque of the vehicle;
a condition switching control module, switching a driving condition and the control algorithm of the vehicle, wherein a switching control is established based on a hybrid theory, and a failure is switched according to a discrete state characteristic of the vehicle;
a driving torque coordinated distribution module, configured to calculate expected torques of the vehicle in a failure of the actuator, and optimally distribute the torques, wherein a reconfigurable control distribution theory is adopted, objective functions for all failures of the actuator are consistent, and a restraint is determined according to a failure determined by the condition switching control module to obtain a driving torque of an unfailed actuator; and
a motor control module, configured to control driving motors and steering motors, and output driving torques of the vehicle;

wherein the objective functions are as follows:

$$\min \varepsilon = \sum_{i=1}^{4} C_i * \frac{\sqrt{F_{xi}^2 + F_{yi}^2}}{\mu_i F_{zi}},$$

where min$\varepsilon$ is a minimum value of a difference between an expected output torque of a motor and a currently output torque of the motor, $C_i$ is a tire adhesion margin of i-th driving wheel, $\mu_i$ is a tire adhesion coefficient, $F_{xi}$ is a longitudinal force, $F_{yi}$ is a lateral force, $F_{zi}$ is a vertical force, and i=1, 2, 3, 4 represents a left front driving wheel, a right front driving wheel, a left rear driving wheel, and a right rear driving wheel of the vehicle;

wherein in a case that the determined failure is an unfailed condition of the actuator, the restraint is as follows:

$$\sum_{i=1}^{4} F_{xi} = F_t$$

$$\frac{1}{2}(F_{x1} + F_{x2} - F_{x3} - F_{x4}) = M_z$$

$$|F_{xi}| \leq \frac{T_{max}}{r}$$

$$F_{xi}^2 + F_{yi}^2 \leq (\mu_i F_{zi})^2$$

wherein, $F_t$ is a total driving force, $M_z$ is a yaw torque, $T_{max}$ is a maximum output torque of a motor corresponding to the i-th driving wheel, r is a radius of the i-th driving wheel;

wherein in a case that the determined failure is a partial failure of the actuator, the restraint is as follows:

$$\sum_{i=1}^{4} F_{xi} = F_t$$

$$\frac{1}{2}(F_{x1} + F_{x2} - F_{x3} - F_{x4}) = M_z$$

$$|F_{xi}| \leq \frac{T_m}{r}$$

$$F_{xi}^2 + F_{yi}^2 \leq (\mu_i F_{zi})^2$$

wherein, $T_m$ is a currently output torque of a driving motor;

wherein in a case that the determined failure is a single-driving-motor failure, the restraint is determined to be that an output torque of a failed motor is equal to an output torque of a coaxial motor and both of which are equal to a maximum output torque of the failed motor;

wherein in a case that the determined failure is a coaxial dual-driving-motor failure, the restraint is as follows:

$$T_{A1} \leq \min(T_{B1}, T_{B2})$$

$$T_{A2} \leq \min(T_{B1}, T_{B2})$$

wherein $T_{A1}$ and $T_{A2}$ are output torques of two faulty driving motors, and $T_{B1}$ and $T_{B2}$ are maximum output torques of the two faulty driving motors $T_{A1}$ and $T_{A2}$, respectively;

wherein in a case that the determined failure is a hetero-axial dual-driving-motor failure, the restraint is as follows:

for a case that a left front driving motor and a right rear driving motor occur failure, $$T_1 \leq T_2$$

$$T_4 \leq T_3;$$

for a case that a right front driving motor and a left rear driving motor occur failure, $$T_2 \leq T_1$$

$$T_3 \leq T_4;$$

wherein, $T_1$ is an output torque of a left front driving motor, $T_2$ is an output torque of a right front driving motor, $T_3$ is an output torque of a left rear driving motor, and $T_4$ is an output torque of a right rear driving motor; and wherein in a case that the determined failure is a homo-lateral dual-driving-motor failure and a multi-driving-motor failure, the four-wheel-independent-drive (4WID) electric vehicle (EV) brakes emergently.

6. The system for controlling a 4WID EV according to claim 5, wherein the condition switching control module switches the driving condition of the vehicle based on a switching control theory, and comprises:

an event identifier, configured to monitor and analyze vehicle information;

a condition switcher, configured to switch the driving condition of the vehicle according to the vehicle information, and select a control strategy meeting a control objective; and a switching monitor, configured to ensure a stability of switching the driving condition of the vehicle.

\* \* \* \* \*